Aug. 27, 1935.  A. BARÉNYI  2,012,334
PHOTOGRAPHIC FILM CAMERA
Filed May 2, 1934  2 Sheets-Sheet 1
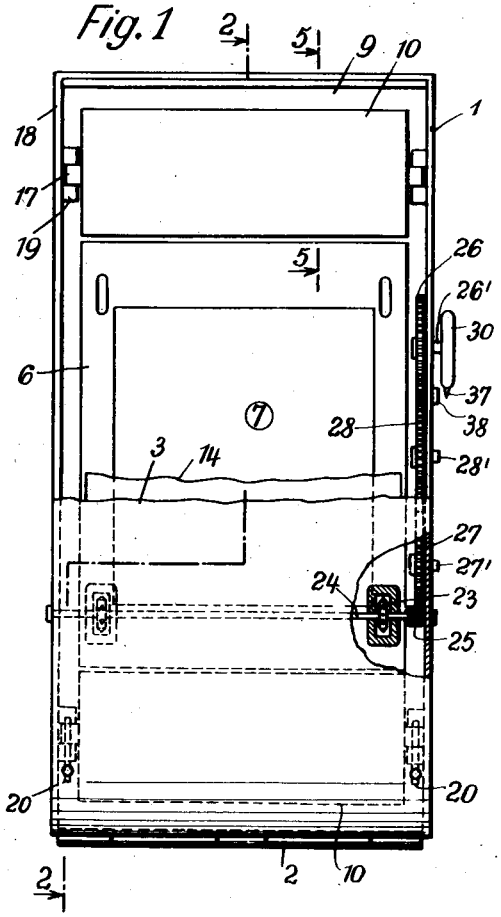
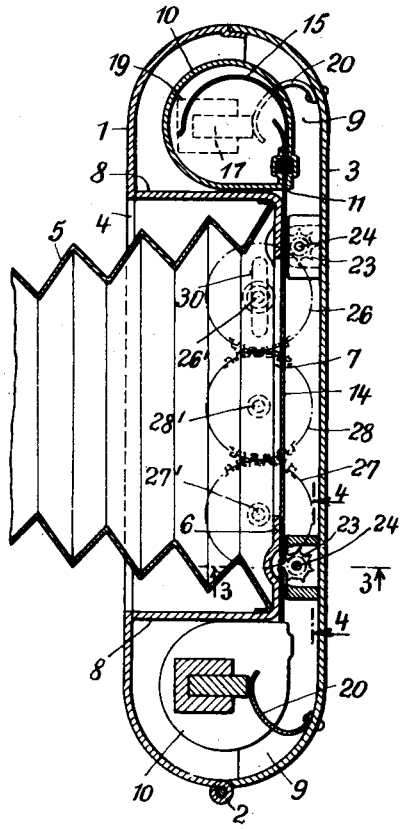
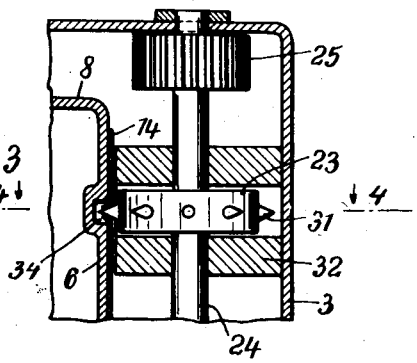
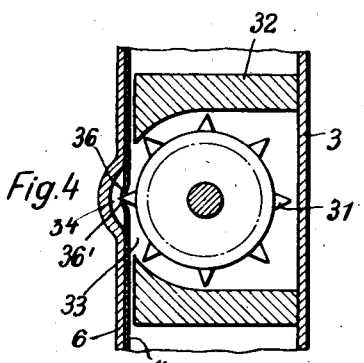
INVENTOR
Árpád Barényi
By
Frank Reinhold
ATTORNEY Aug. 27, 1935.  A. BARÉNYI  2,012,334
PHOTOGRAPHIC FILM CAMERA
Filed May 2, 1934　　2 Sheets-Sheet 2
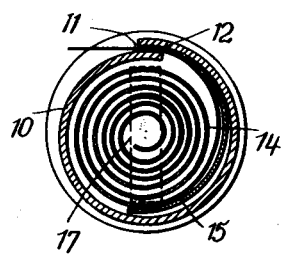
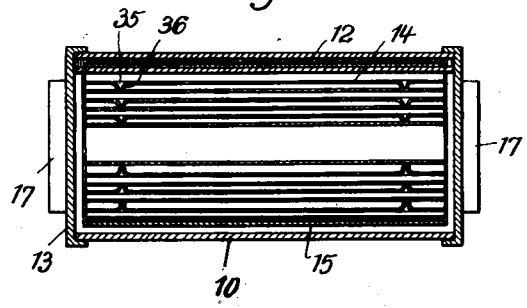

UNITED STATES PATENT OFFICE 2,012,334

PHOTOGRAPHIC FILM CAMERA

Arpád Barényi, Berlin-Lichterfelde, Germany, assignor to Voigtländer & Sohn Aktiengesellschaft, Brunswick, Germany, a joint-stock company of Germany Application May 2, 1934, Serial No. 723,457
In Germany May 4, 1933

6 Claims. (Cl. 95—32)

This invention relates to improvements in photographic film cameras, comprising a film delivering and/or a film receiving box each formed with a tangential slot for the passage of the film therethrough, and a guiding surface for the film. It has heretofore been proposed to reduce the friction of the film being passed, after exposure, into the film receiving box, by providing point or line contact between the film and the wall of the film receiving box. The object of the improvements is to provide a camera of the class indicated in which the film feeding member takes the form of a rotary disk or an endless chain provided on its film feeding surface with prongs adapted to pierce the film and to form ridges thereon and in which the film guiding surface is formed with a recess located opposite to the feeding member and its prongs and having a size substantially not larger than what is needed for the passage of the prongs into the same and the formation of the ridges on the film. By thus providing the feeding members with prongs and the guiding surface with recesses ridges are formed on the film which provide line or point contact between the convolutions of the film being coiled within the film receiving box, the said ridges having the functions, first, to reduce friction and, second, to space the convolutions of the film apart, so that the sensitized surface of the film is not liable to be injured by contact with the body of the film.

Other objects of the improvements will appear from the following description.

For the purpose of explaining the invention an example embodying the same has been shown in the accompanying drawings in which the same reference characters have been used in all the views to indicate corresponding parts. In said drawings, Fig. 1 is a rear elevation of the camera partly in section and with some parts broken away, Fig. 2 is a fragmentary sectional elevation taken on the line 2—2 of Fig. 1 and showing the casing of the camera and a part of the bellows, Fig. 3 is a fragmentary sectional bottom view on an enlarged scale taken on the line 3—3 of Fig. 2 and viewed in the direction of the arrows, Fig. 4 is a sectional elevation taken on the line 4—4 of Fig. 3, Fig. 5 is a sectional elevation on an enlarged scale taken on the line 5—5 of Fig. 1 and showing the film receiving box, and Fig. 6 is an elevation partly in section and viewed from the left in Fig. 5.

In the construction shown in Figs. 1 and 2 the camera comprises a sheet metal casing 1 which is closed at its rear by a lid 3 hinged thereto at 2. At its front side the casing is formed with an opening 4 for the bellows 5 and the lens front (not shown) and around the said opening flanges 8 of a frame 6 are secured to the casing, the said bellows being fixed internally to the frame 6. The frame provides a backing for the film 14, and it is formed with an exposure opening 7. Respectively above and below the flanges 8 chambers 9 are provided by the casing 1 and the lid 3, in which the winding off and winding on film carriers are mounted.

The said film carriers are shown in detail in Figs. 5 and 6. As is shown in the said figures the said carriers 10 take the form of substantially cylindrical boxes, and they are formed with longitudinal slots 11 for the passage of the film therethrough, the admission of light through the passages being prevented by strips 12 of plush or the like. At one end the film delivering box 10 is provided with a removable lid 13 through which the unexposed film spool is passed into the same, the free end of the film being passed outwardly through the slot 11. After the film spool has thus been placed into the box the film may be retracted therefrom by means of feeding mechanism to be described hereinafter and passed into the film receiving box 10. The constructions of the film delivering and film receiving boxes are alike. After the film delivering box 10 containing an unexposed film wound into a spool has been placed into the chamber 9 the free end of the film is partly retracted from the box and inserted into the tangential slot 11 of the film receiving box 10, whereupon it is further pushed into the said receiving box by the feeding mechanism. Within the said film receiving box the film is wound into convolutions by being passed on a cylindrical guiding surface. In order to facilitate the inserting of the film it is preferred to provide a curved leaf spring 15 within the film receiving box 10, the said spring being fixed to the inner wall of the box 10 near the slot 11 thereof and extending therefrom substantially in circumferential direction and away from the wall of the box. By the said spring the film is bent into convolutions while the spring 15 gradually yields outwardly. Therefore it is not necessary for the portion of the film being inserted through the slot 11 and between the convolutions and the spring to shift the superposed convolutions relatively to one another for reducing the diameter thereof.

In the constructions shown in the figures the boxes 10 are provided at their end faces with diametrical cleats 17 and the end walls 18 of the film chambers 9 are equipped with corresponding U-shaped guide members 19, as is shown in Figs. 1 and 2, the open ends of the said guide members being directed towards the lid 3. Thus the boxes may be readily passed into the chamber 9 with their cleats 17 guided in the guide members 19. The said guide members 19 are arranged so that the tangential slots 11 of the boxes 10 are flush with the backing of the film provided on the frame 6 and therefore they are located in the plane of the image produced by the objective. After the lid 3 has been closed the boxes 10 are held in position against displacement by leaf springs 20 secured to the lid 3, the said springs bearing on the outer ends of the cleats.

In the construction shown in Figs. 1 to 4 the film feeding mechanism comprises four disks 23 formed with points or teeth 31, the said disks being fixed in pairs to shafts 24. The said shafts extend transversely through the casing of the camera at the rear of the frame 6, and they are mounted in the end walls of the lid 3. At one of their ends the said shafts are provided with pinions 25 which are in mesh with gear wheels 26 and 27 rotatably mounted on pivot bolts 26' and 27' secured to the end wall of the camera casing. The gear wheels 26 and 27 are connected with each other by an intermediate gear wheel 28 rotatably mounted on a pivot bolt 28' secured to the end wall of the casing 1. Therefore rotary movement of one of the shafts 24 imparts corresponding rotary movements in the same direction to all the disks 23. The pivot bolt 26' of the gear wheel 26 extends outwardly and through the wall of the casing, and it carries a film winding key 30 by means of which the film feeding mechanism may be operated from without while the camera is closed.

As is shown in Figs. 3 and 4 the disks 23 are disposed within housings 32 secured to the lid 3 and extending close to the film 14 located in front of the disks 23 and at the rear of the frame 6. At its front side the said housing is formed with an opening 33 the size of which is such that the points 31 may pass through the same outwardly and into position for engaging the film 14. Opposite to the said opening the frame 6 is formed with a depressed portion or recess 34 permitting the pins 31 to pass outwardly from the housing 32 without being interfered with by the wall of the frame 6. The size of the depressed portion and also that of the opening 33 is such only as is necessary for permitting the passage of the points 31 and punching the film. Between the housing 32 and the adjacent portion of the frame 6 the film is safely guided at the part where it is punched by the points 31 so that it cannot yield when it is acted upon by the points.

As is shown in Fig. 4 the pins 31 passed through the film produce holes 35 and ridges 36 around the said holes. When the exposed film is wound into a spool within the film receiving box 10 the said ridges 36 provide spacing members between the superposed convolutions of the film. Thereby winding of the film is considerably facilitated because there is only point contact between the superposed convolutions and therefore the friction is comparatively small. Further, by the said ridges or spacing members any undesirable reaction between the film and its sensitized coating is avoided.

To provide film feeding mechanism which is located separately from the film spools and outside the boxes 10 is advantageous because the film winding key by means of which the feeding mechanism is operated is always turned through the same angle for feeding the film a distance corresponding to the length of the image. In the construction shown in Figs. 1 and 2 the gear ratio of the mechanism is such that a single complete revolution of the film winding key 30 is needed for feeding the film a distance corresponding to the length of an image. If therefore on the film winding key and the corresponding part of the casing 1 indication marks 37 and 38 are provided the windows ordinarily provided in the lid of the camera for indicating the position of the film may be dispensed with, and the said position may be safely ascertained from the marks 37 and 38 by imparting one or more complete rotary movements to the film winding key.

I claim:

1. A photographic camera, comprising a casing, film delivering and receiving devices, feeding mechanism comprising feeding disks formed with pins and located in positions for punching the marginal portions of the film being fed, said camera casing providing a backing for the film being fed which is formed opposite the said disks with recesses of a breadth substantially equal to the thickness of the pins and located in positions for accommodating the pins.

2. A photographic camera, comprising a casing, film delivering and receiving devices, film feeding mechanism comprising feeding disks adapted to engage the film, an operating member for said disks, and gearing intermediary said disks and operating member adapted to transmit the movement of the operating member into larger movement of the disks.

3. A photographic camera as claimed in claim 2, in which the gear ratio intermediate the operating member and the disks is such that a complete rotation of the operating member causes a complete film feeding operation.

4. A photographic camera, comprising a casing, film delivering and receiving devices, feeding mechanism comprising feeding members formed with pins and located in positions for punching the marginal portions of the film being fed, said camera casing providing a backing for the film being fed which is formed opposite the said members with recesses of a breadth substantially equal to the thickness of the pins and located in positions for accommodating the pins.

5. A photographic camera, comprising a casing, film delivering and receiving devices, film feeding mechanism comprising feeding members adapted to engage the film, an operating member for said members, and gearing intermediary said members and operating member adapted to transmit the movement of the operating member into larger movement of the members.

6. A photographic camera as claimed in claim 5, in which the gear ratio intermediate the operating member and the feeding members is such that a complete rotation of the operating member causes a complete film feeding operation.

ARPÁD BARÉNYI.